United States Patent

Murray

[19]

[11] Patent Number: 5,839,659
[45] Date of Patent: Nov. 24, 1998

[54] CAPILLARY ROOT ZONE IRRIGATION SYSTEM

[75] Inventor: Eric Stewart Atholl Murray, New South Wales, Australia

[73] Assignee: Grain Security Foundation Ltd, New South Wales, Australia

[21] Appl. No.: 727,567

[22] PCT Filed: Aug. 14, 1995

[86] PCT No.: PCT/AU95/00496

§ 371 Date: Oct. 23, 1996

§ 102(e) Date: Oct. 23, 1996

[87] PCT Pub. No.: WO96/04780

PCT Pub. Date: Feb. 22, 1996

[30] Foreign Application Priority Data

Aug. 12, 1994 [AU] Australia ............................... PM7439

[51] Int. Cl.$^6$ ........................ B05B 15/00; A01G 25/06; A01G 27/00
[52] U.S. Cl. ........................ 239/1; 239/145; 239/201; 239/542
[58] Field of Search .................... 239/145, 201, 239/542, 556, 557, 560, 561, 566, 569, 570, 601, 11, 10

[56] References Cited

U.S. PATENT DOCUMENTS

| | | | |
|---|---|---|---|
| 1,389,319 | 8/1921 | Quigley | 239/201 X |
| 3,205,619 | 9/1965 | Henry | 239/566 |
| 3,361,359 | 1/1968 | Chapin | 239/145 |
| 3,946,762 | 3/1976 | Green | 239/542 X |
| 4,062,306 | 12/1977 | Wosmek | 239/569 X |
| 5,246,164 | 9/1993 | McCann et al. | 239/11 |
| 5,263,791 | 11/1993 | Zeman | 239/542 X |

FOREIGN PATENT DOCUMENTS

| | | |
|---|---|---|
| 4483379 A1 | 9/1979 | Australia . |
| 627697 | 3/1989 | Australia . |
| 18234 A1 | 10/1980 | European Pat. Off. . |
| 155143 | 9/1985 | European Pat. Off. ............... 239/145 |
| 2323317 | 4/1977 | France . |
| 2331953 | 6/1977 | France . |
| 2387582 | 11/1978 | France . |
| 2473262 | 7/1981 | France . |
| 2610384 A1 | 9/1976 | Germany . |
| 3041534 A1 | 6/1982 | Germany . |

*Primary Examiner*—Andres Kashnikow
*Assistant Examiner*—Robin O. Evans
*Attorney, Agent, or Firm*—Birch, Stewart, Kolasch & Birch, LLP

[57] ABSTRACT

A capillary system provides water, nutrient solutions and gases such as air to the root zone of plants. The system uses one or more conduits having perforations spaced apart therealong, with the conduits being held in pockets. The pockets are formed with an upper layer of capillary cloth and a lower layer of capillary cloth and/or a water impermeable material. The conduits are provided with devices for connection to a supply of water and the like. In use, the capillary system is buried to an appropriate depth in soil below the plants to be irrigated. The upper layer of capillary cloth is wet by the flow out of the perforations and serves to distribute water evenly to the roots. Valves are optionally provided to control flow through the conduits.

28 Claims, 5 Drawing Sheets

CAPILLARY ROOT ZONE IRRIGATION SYSTEM

FIELD OF THE INVENTION

This invention relates to apparatus and methods for the irrigation of plants, in particular in one form to a subterranean system for supplying water, nutrient solutions and/or gases to the root zone of plants growing in the soil and in another form to a system for supplying water, nutrient solutions and the like to pot plants.

BACKGROUND TO THE INVENTION

Water resources are at a premium worldwide with governments budgeting substantial amounts towards water conservation both in residential areas and rural areas.

In response to this ongoing problem, systems have been developed to apply water directly to the soil surface around individual plants so as to minimise water loss. These systems involve sprays, micro-drips and the like. However, water is still lost through run off and through evaporation.

Other systems use capillary watering which is based on the supply of water into the subterranean soil. Water provided in this way moves upwardly in the soil by capillary action so as to enter the root zone of a plant.

Unlike surface watering, capillary watering does not suffer as much from loss due to run off or evaporation. Capillary watering is advantageous to the plant growth as the rate of water movement is slow enough to ensure that most of the water is absorbed by the roots. Furthermore, the majority of the evaporation that occurs will be by transpiration of the plant foliage thus facilitating a greater resistance to heat stress.

Attempts have been made to use capillary watering systems for even ground over relatively short distances of up to 50 m, examples of these systems are BI-WALL TUBING (Registered Trade Mark), T-TAPE (Registered Trade Mark) and LEAKY PIPE (Registered Trade Mark). However, all of these systems suffer from two problems. Firstly, the perforations and supply lines are prone too blockages from build up of algae, bacterial slime, soil colloids, particles and root penetration. Secondly, the water is supplied only to the soil in the immediate pipe or channel environment.

Other systems such as Netafim, have been used for longer runs. However, these systems still suffer from the problem of only supplying water to the roots in the soil area in proximity to the water supply pipe. Furthermore, these systems still have a tendency towards blockage in the outlet orifices.

The present inventor has recognized both the advantages of capillary watering while appreciating the difficulties inherent in the currently available systems. He has therefore sought to provide a capillary watering system which overcomes or at least ameliorates the difficulties of the prior art systems.

DISCLOSURE OF THE INVENTION

Accordingly, in a first aspect, this invention consists in a capillary system for providing a fluid to the root zone of plants comprising one or more perforated conduits sandwiched between an upper layer of a capillary cloth and a lower layer of a capillary cloth and/or a water impermeable material and a connection means for one end of the conduit (s) so as to allow for the supply of fluids, including water, solutions and/or gases thereto and optionally a fluid flow control means for another end of the conduit(s) remote the one end.

In a second aspect, the invention further consists a method for providing a fluid to the root zone of plants comprising, disposing a system which comprises one or more perforated conduits sandwiched between an upper layer of a capillary cloth and a lower layer of a capillary cloth and/or a water impermeable material and a connection means for one end of the conduits(s) so as to allow for the supply of fluids including water, solutions and/or gases thereto, and optionally a fluid flow control means for another end of the conduit(s) remote the one end, within an area of soil below and in proximity to the root zone of plants growing in the soil;

supplying a source of fluid including water, solutions and/or gases to the connection means so as to supply fluid to the conduit(s); and adjusting the flow of fluid, optionally by operating the fluid control means for the other end, so as to cause fluid to flow out of the perforations to thereby permeate the upper layer and provide fluid including water, nutrient solution and/or gases to the roots.

The capillary root zone irrigation system of the invention is not limited in its application to supplying fluids to roots in sub-surface situations. This system may be readily adapted for use in providing water, nutrient solutions and the like to pot plants.

In this particular form, a layer of weed mat is disposed over the upper layer of capillary cloth. In use, pots are placed on the weed mat with the supply of water, nutrient solutions and the like occurring by wetting of the capillary cloth which in turn supplies water to the underside of the pots. Openings in the underside of the pots allow for the water to migrate into the soil contained in the pots and hence the roots of the plants growing therein.

In its broadest form, the presence of the upper capillary cloth layer serves three prime functions. Firstly, the capillary cloth acts to distribute water over the entire layer thereof thus ensuring that water is available to roots which are not in proximity to the perforated conduit. Secondly, it acts to prevent root penetration into the perforations. Thirdly, it allows water to permeate the layer while preventing the movement of soil particles that might block the perforations in the conduit.

As used in this specification "capillary cloth" refers to a textile material that has the ability to distribute water and other fluids by capillary action. Products satisfying this description are unavailable under the generic name "geo-textile".

In topographies where slopes are not so steep, a proportion of the lower layer will include a water impermeable layer. This layer will function to retain water in the space between the two layers and around the conduit. Thus it will have the effect of minimizing water loss while maximizing the amount of water to be transferred to the upper capillary layer and hence to plant roots.

Preferably the water impermeable layer will be disposed in an area underneath and adjacent the conduit. The actual extent of this layer will be varied according to the soil texture.

For topographies where steep slopes are encountered, such as embankments adjacent highways, the presence of a lower water impermeable layer is undesirable as it would tend to contribute to erosion through excessive run off. Accordingly, it is preferable to use capillary cloth alone as the lower layer in these situations to minimize any erosion problem while at the same time seeking to maximize water available to plant roots through capillary action.

In all topographical situations, the invention will also facilitate drainage.

This is so since in times of high rainfall, water will be able to pass through the soil and collect in the system of the invention. Obviously, at such times, water would not be supplied to the system via the connection means. Rather the fluid flow control means remote the connection means would be operated to allow water to drain from the system.

In some situations the system of the invention may be advantageously used where sub-surface drainage capacity is required. For these situations, it is desirable to dispose the system in the soil so as to form a concave or dished shape. If the environment is sloping, water may be readily drawn off for storage, recycling or disposal. In a relatively flat environment, the water that accumulated in the system may be removed by pumping.

The ability to perform a sub-surface drainage function using the system of the invention is important as it will (a) inhibit rise of water tables and associated salinity; and
(b) reduce periods of time that plants experience waterlogging due to heavy rain or other factors.

This latter feature is of particular importance as waterlogging produces oxygen starvation and adversely affects plant health and growth.

Desirably the perforated conduit will be dimensioned so as to slide into a preformed pocket formed between the layers by, for example, stitching, sonic welding or gluing portions of the upper and lower layers. In this way, a pocket may be formed that extends the full length of the layers which might be 50 m or more.

Perforated conduits may be formed into an array between the layers with each conduit being spaced apart from adjacent conduits by an appropriate amount. As mentioned above, the use of a plurality of conduits in an array like this may be achieved by an array of pockets formed in the layers as described.

It should be noted that layers of a substantial area may be readily formed with pockets and packed for transport along with rolls of perforated flexible conduit.

Conduits may be formed from polyethylene, typically with sections ranging between 18 and 75 mm. Perforations may be readily introduced into these conduits so as to provide a flexible, long-lasting material. In this regard, it must be appreciated that the diameter may be varied according to the length of a run as well as within a run.

Typically, the width of a capillary system of the invention may range between about 300 mm and 900 mm.

It will be appreciated that "units" of the system of the invention may be joined end to end at the conduits to form more extensive root and zone irrigation systems.

Depending on factors such as topography, soil types, crop types and water absorption rates, nature of soil drainage, climate rainfall and ambient temperature, length of run and water quality, water volume and time frame it is possible to provide a predetermined density of perforations over the full length of the conduit, with perforations of predetermined and optionally varying sizes, so as to optimize the amount of water delivered to a particular site.

Of these factors, soil type and steepness and length of slope are particularly important.

Soil type is important as it will govern the rate of transmission of water from the system of the invention through the soil above to the root zone. Steepness and length of slope are important, for example, there may be no perforations in a conduit below the peak of a slope if it is steep or short or the soil has a slow rate of uptake (perhaps due to clay content). By contrast, a sandy soil with a rapid water uptake, or a situation where the slope is longer may require intermediate perforations located in the downsloping portion of the line.

Similarly, an analysis of plant needs within a local environment taking account of factors such as soil physics and hydraulics, climate, water table, length of run and the like will determine the diameter of the conduit selected together with the frequency, size and placement of the perforations.

In some cases, gas injection will also be a relevant factor. The use of computer software to take account of these factors and drive a numerical control machine to appropriately perforate the conduit is within the scope of the invention.

While a number of materials may be used to form the upper and lower layers, it is preferred to use geotextile which may be varied in width and thickness as appropriate. In those circumstances where the lower layer is water impermeable, it is preferred to use polyethylene sheet.

For guidance, generally the perforations in the conduit will be at least $0.75$ mm$^2$, preferable $3$ mm$^2$ or greater. Usually the perforations will be circular, typically about 2 mm in diameter or greater. They may, however, be for example rectangular or any other shapes, being 1.5×4 mm or greater.

Generally, as a maximum, the perforations will be no greater than about 25 mm$^2$.

A connection means is provided to permit the system to be brought into fluid communication with a source of the fluid. This may be readily achieved by the use of a variety of well known plumbing connections and arrangements. For example, a flexible hose carrying water could be connected to a conduit through an appropriate plug and socket arrangement.

Alternatively, a plurality of conduits could be interconnected at one end so as to form a manifold with a single connection means being provided therein.

It is also within the scope of the invention to include a valve in the system of the invention to control fluid flow to a conduit. Such a valve may be associated with the connection means or integral therewith.

At the end of a conduit remote the end to which fluid flows into the system, there may be provided a fluid flow control means. In one form, this may simply be a plug or stop which is either removable or fixed. In another form, it may comprise a valve.

It will be of course be appreciated by those skilled in the art that electromechanical valves and the like may be used to control fluid both entering and leaving the system of the invention. Such devices are particularly useful in maintaining control over remotely located installations of the system.

Similarly, it will be appreciated that various types of sensors may be used in conjunction with electromechanical valving arrangements to provide an automated means for the maintenance of plants. An example of an arrangement of this type would be the use of moisture sensors in the soil controlling electromechanical valves in the fluid inlet side of the system.

Although the description has been largely directed towards the provision of water to the roots, it will be appreciated that any fluid material may be supplied. Some fluids that may be supplied are nutrient solutions, pesticide solutions, gases such as oxygen and nitrogen either alone or provided with the water or other solutions.

When water is to be supplied to the system, it may be drawn from a variety of sources such as dams, bores and rivers. In some cases, it may be desirable to filter the water prior to supply to ensure that the perforations are not blocked. Generally, however, using the system of this invention, filtration is not expected to be routinely required or at least not as frequently as prior art systems.

In some circumstances, it may be appropriate to treat dam water or river supplies with chlorine to reduce suspended solids size without causing chlorine toxicity. Alternatively chlorine could be introduced into the system and/or mixed with air to keep perforations clear from roots.

The ability to deliver nutrient solutions to the root zone is an important difference and advantage over prior art fertigation (fertilizing irrigation) systems which rely upon overhead and/or micro-irrigation methods. In these systems, the nutrients are applied to the soil surface for plant absorption. However, because the nutrients are applied to the surface, loss will occur through evaporation and run off. Moreover, a poor soil structure will result in the nutrients being held on the soil surface or if the soil structure has large pore spaces, nutrients will be rapidly leached out.

It is also advantageous over subsoil systems as the system of the invention either prevents or substantially limits the loss of nutrients and water downwardly.

The most limiting growth factor in plants when all others are present is a fresh supply of oxygen to the pore space surrounding root hairs. Respiration in the roots requires oxygen for all cell building and energy requirements for a plant. The respiration by-product is carbon dioxide which if allowed to build up to excessive levels and replace oxygen dramatically reduces plant growth.

For example, long term crops such as grapes suffer from soil compaction and degraded soil structure which causes a severe lack of oxygen and increases in harmful anaerobic microorganism activity around the roots.

By contrast with prior art systems, the present invention can be used to deliver fresh air to crops especially row crops. This is achieved by introducing air into the water to be circulated through the system. In this way, air may be readily supplied to plant roots in all soil texture types. Additionally, the presence of air in the water stream will assist to mimimise blockage of perforations in the conduit. The presence of optimal amounts of fresh air in the root zone encourages beneficial natural microorganisms which contribute to the breakdown of organic matter and release of essential soil nutrients while inhibiting harmful anaerobic microorganism growth.

As well as air and oxygen, other gases such as nitrogen may be supplied to roots for direct absorption. In this way, the need for additional fertigation may be reduced.

Gases may be supplied into a fluid stream such as water, for example, by use of a means such as a venturi in the water supply line or direct pumping.

Alternatively, gases, being fluid, may be directly introduced in the absence of another fluid using means such as compressors and sources of compressed gases.

The present invention may be widely applied in a range of applications including vegetable row cropping viticulture fruit trees forestry turf (including farming and sporting areas)

erosion control banks parks and domestic gardens nurseries to deliver fluids including water, nutrient solutions and gases to the roots of these plants.

Moreover, since the invention may be effectively used over long distances and uneven topographies, it may be practically utilized in all sites where plants are grown.

It should also be noted that the invention may be operated in conjunction with available systems which monitor environmental conditions and automated through the use of solenoid valves and the like.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Three examples will now be described with reference to the accompanying figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

MODES FOR CARRYING OUT THE INVENTION

Figure 1:
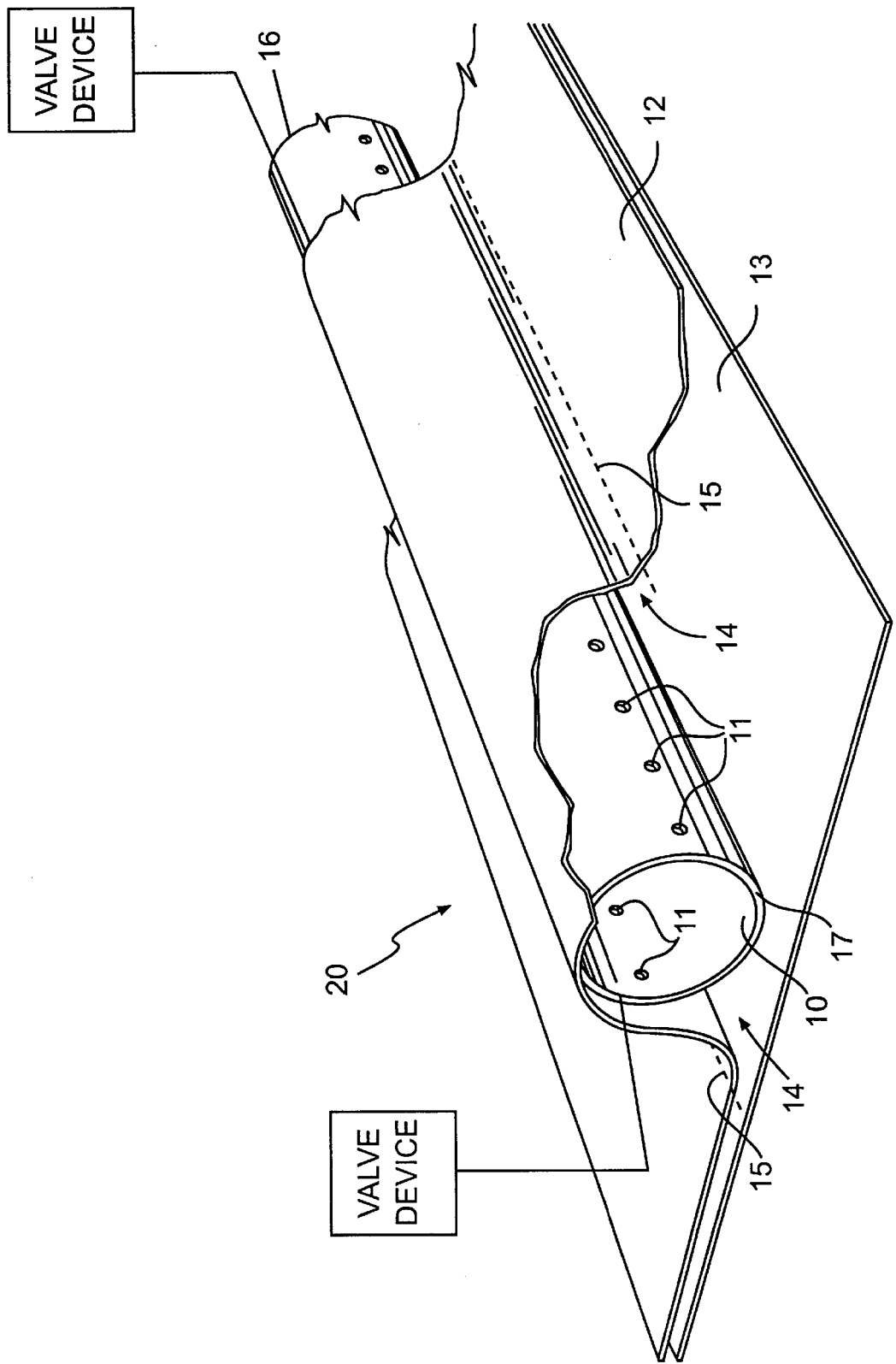
FIG. 1 is a cutaway perspective view of a capillary root zone watering system of the invention for use in agriculture, such as cultivation of vegetables.

As shown in FIG. 1, the watering system (20) comprises a 25 mm diameter flexible polyethylene pipe (10) in which an array of perforations (11) having diameters varying between 2 mm and 4 mm have been formed in the wall thereof. Overlapping the pipe (10) is a layer of geotextile capillary cloth (12) which is joined to an underlay (13) of geotextile capillary cloth in a manner so as to form a linearly extending pocket (14). Joining may be effected by, for example, sewing or gluing the layers (12), (13) along appropriately spaced apart parallel lines (15).

In the example shown, the pocket (14) extends throughout the length of the system which may be of the order of 50 m or more.

To assist in placing the pipe (10) in the pocket (14) a cord may be inserted into the pocket (14) during formation such that it extends the full length. This allows for the geotextile layers to be folded and transported separately to the perforated pipe (10). On site, the cord is attached to one end of the pipe (10) and the pipe is then carefully pulled into the pocket (14) until it extends the full length thereof.

In use, one end (16) of the pipe (10) may be readily connected to a variety of standard fittings so as to facilitate the ready supply of water nutrient solutions, gases and the like. Such fittings may include valves and the like to allow for the controlled introduction of fluids.

The other end (17) of the pipe (10) will generally be closed, preferably by a valve. In this way, as appropriate, the valve may be opened to facilitate drainage of water from a site.

As an alternative, the lower layer (13) may be formed from a water impermeable material such as a polyethylene sheet.

Figure 2:
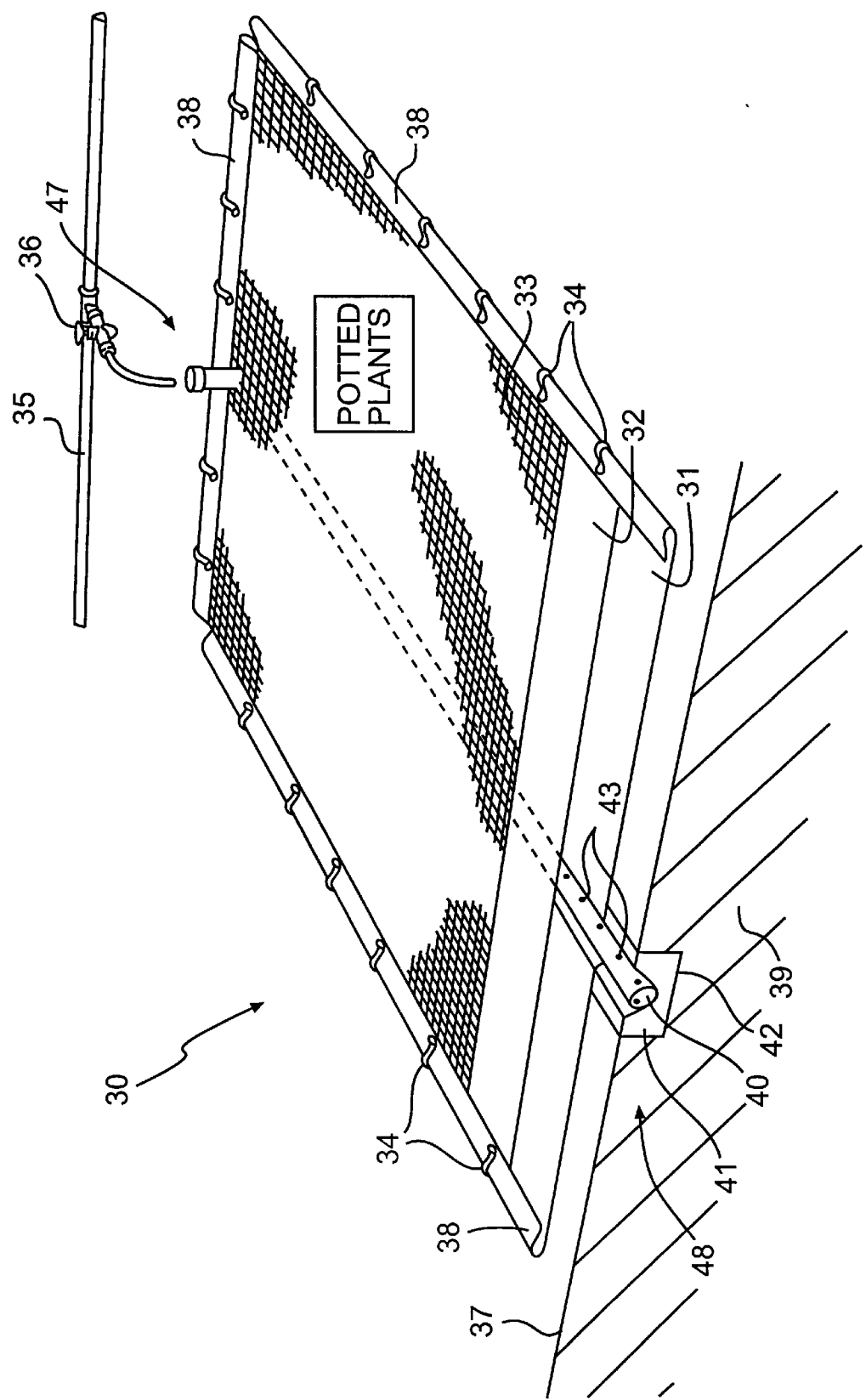
FIG. 2 is a cutaway perspective view of another form of a capillary root zone irrigation system of the invention for use in watering pot plants on a sloping site.
Figure 3:
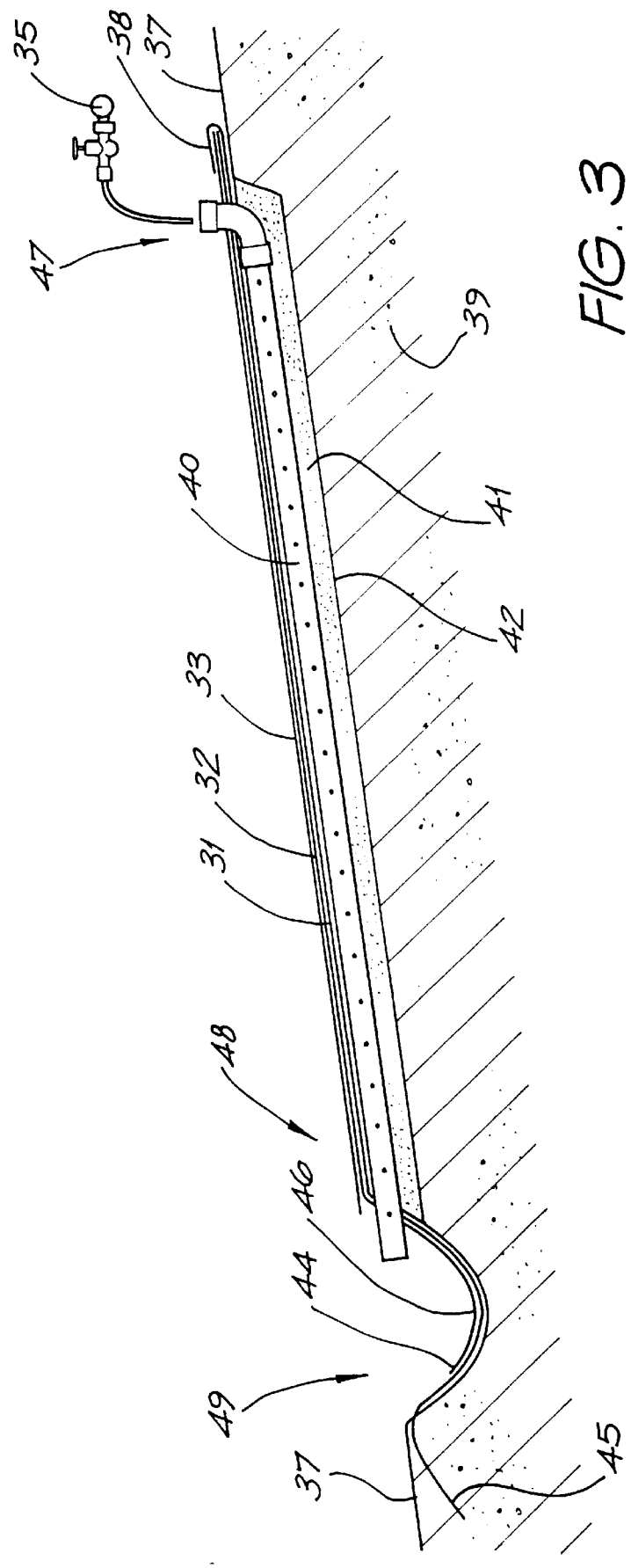
FIG. 3 is a longitudinal sectional view of the system shown FIG. 2.

With reference to FIGS. 2 and 3, there is shown a capillary root zone watering system (30) for use in watering pot plants on a sloping site. The system (30) comprises a planar sheet (31) of polyethylene over which is disposed a planar sheet (32) of geotextile capillary cloth. Between the sheets (31) and (32) is a polyethylene pipe (40) having perforations (43). The pipe (40) extends longitudinally of the sheets (31) and (32) with an inlet end (47) at the higher level and an outlet end at the lower level of the slope.

Perforations (43) are distributed along the pipe (40) with sufficient orifices to ensure adequate wetting of the sheet (32).

Overlaying geotextile sheet (32) is a sheet of weedmat (33) which functions to suppress the growth of weeds on the system. It should be noted that a sheet of perforated polyethylene could be used in place of the weedmat.

In this particular example, water is supplied to the system by feedline (35), the flow of which into inlet (47) of pipe (40) is controlled by a tap (36).

In order to minimize loss, water flowing out of outlet (48) is collected in a drainage trench (49). This trench is formed in the underlaying soil (39) and is lined with a portion of polyethylene sheet (31) in the dish portion (46) continuing into the soil (39) at (45). Additionally, geotextile sheet (32) continues into the trench to (44).

To ensure that the system (30) is correctly located, a longitudinally extending trench (42) is excavated in the soil (39) of a dimension to accommodate pipe (40) and sheet (31) below ground level (37). This is facilitated through the use of sand bed (41) which is disposed in trench (42) so as to support pipe (40).

Along the peripheral edges of the sheets (31),(32) and the weedmat (33) the polyethylene sheet (31) is folded over the weedmat (33) and geotextile sheet (32). This is best seen in FIG. 3 at (38). Along the fold lines, clips (34) are used to hold the sheets in a folded state.

In use, pot plants are placed on the weedmat (33). Water is supplied to the system via feedline (35) and tap (36) which when operated causes water to flow into inlet (47) of pipe (40). Water flows out of pipe (40) through perforations (43) to wet the geotextile sheet (32), polyethylene sheet (31) acting to reduce loss of water to the underlaying soil (39).

Excess water flows out of pipe (40) at outlet (48) into drainage trench (49). Water collected in the trench (49) flows to a collection pond (not shown) for recycling.

Figure 4:
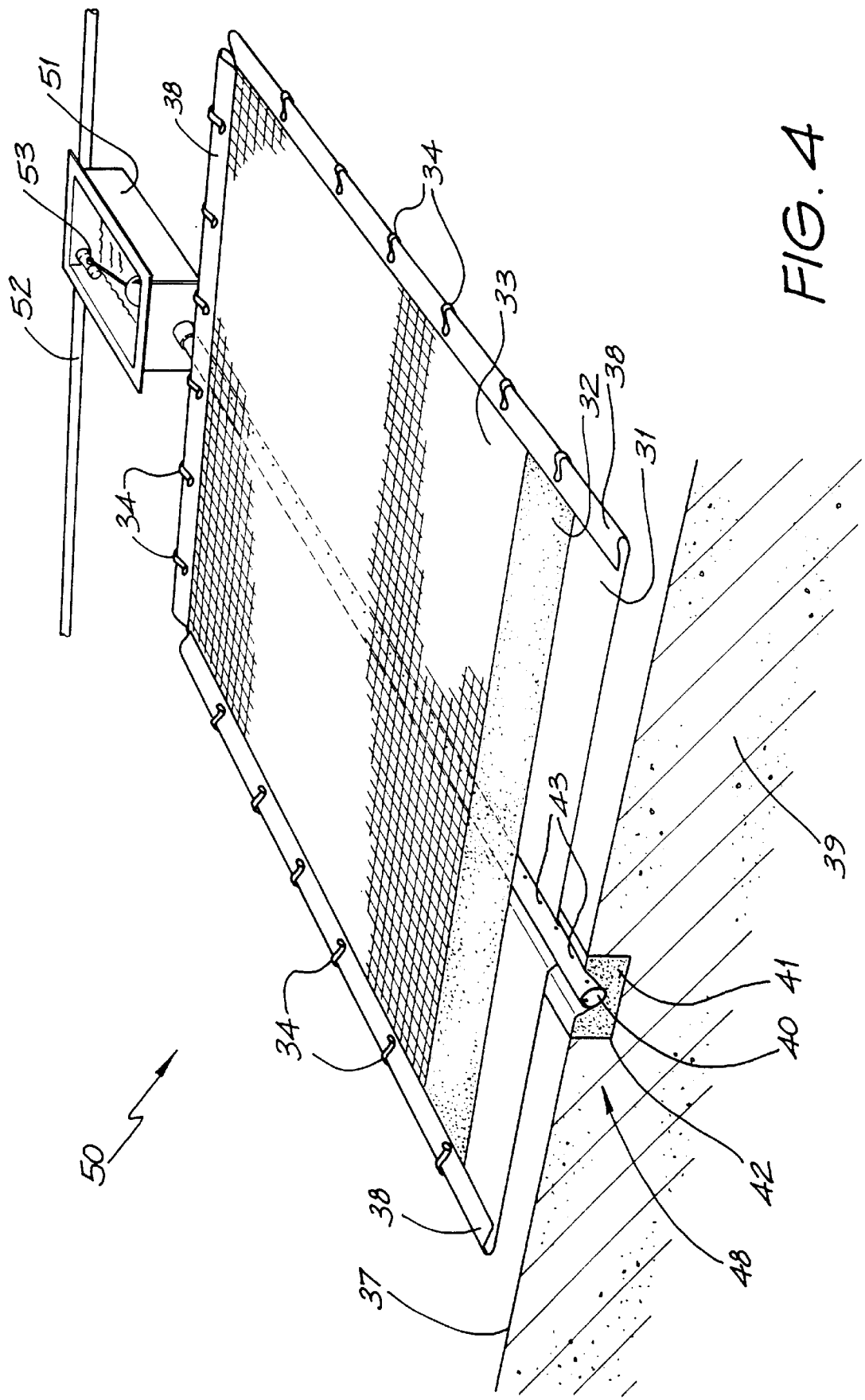
FIG. 4 is a cutaway perspective view of a second form of a capillary root zone irrigation system of the invention for use in watering pot plants on a level site.
Figure 5:
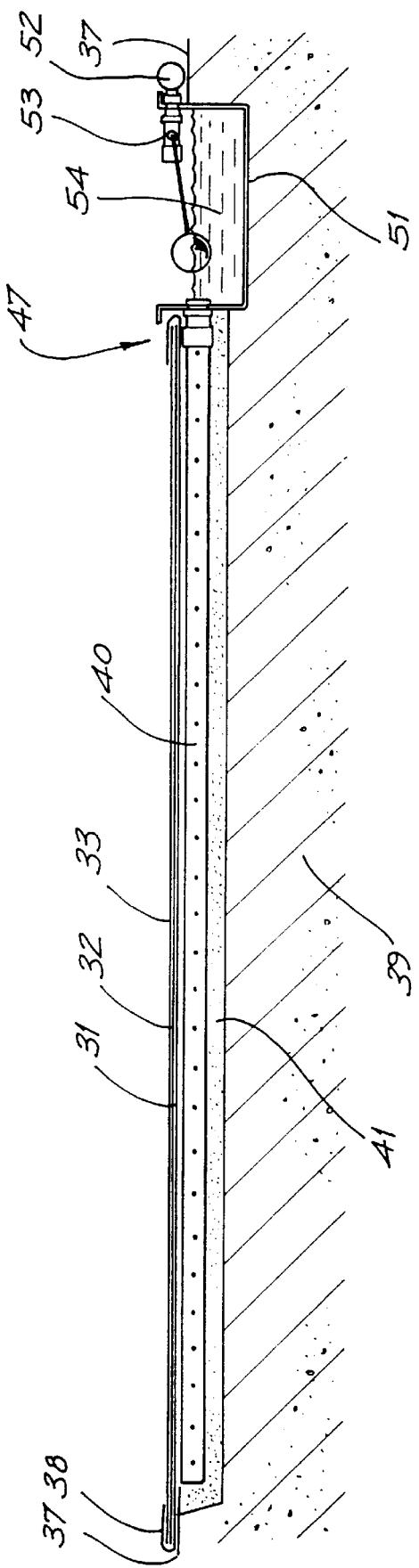
FIG. 5 is a longitudinal sectional view of the system shown in FIG. 4.

In FIGS. 4 and 5, there is shown a second form of capillary root zone watering system which is similar to the form depicted in FIGS. 2 and 3 but is for use in watering pot plants on a level site. For ease of understanding, like features of the form shown in FIGS. 4 and 5 are numbered the same as the corresponding features shown in FIGS. 2 and 3.

The principal difference is the means by which water is supplied to the system (50). Specifically, inlet end (47) of pipe (40) is disposed within a float tank (51) containing water (54). A water supply line (52) mounted on the float tank (51) is controlled by a float valve (53) in a manner such that as the water level falls in the tank, the valve (53) causes water to flow into the tank via line (52). Provided that the level of water in tank (51) remains at a level higher than the inlet (47), water will flow into pipe (40).

In all other respects, this form of the invention is the same as the form described with reference to FIGS. 2 and 3.

The present inventor believes that this invention has a number of advantages including:

substantial water savings (up to 70% of water used as compared with conventional systems)

reduction in erosion reduction in leaching of salt, fertilizer and other substances into water courses reduction in salination of agricultural lands reduction in weed infestation (weeds only thrive in circumstances where water is received through the soil surface)

improved provision of fertilizers to plants avoidance of crystallization of nutrients on plants or in soil which can result in burning through phytotoxicity improved aeration of the soil and roots ability to use low pressure water including gravity feed, supplied either naturally from water courses and the like or by above surface tanks longer life in situ irrigation/fertigation is available immediately as required reduction in labour requirement as the system may be readily automated and prior art chemical treatments such as dosing with chlorine is either avoided or substantially reduced improved soil structure through a reduction in tilling and encouragement of beneficial microorganism activity reduction in plant stress reduction in need for chemical fertilizers because of targeted delivery and increase in other growth factors such as water and air accuracy in placement of fertilizers, affording the ability to add specific or individual nutrients to the plant roots and schedule this with growth and weather conditions.

reduction in need for pesticides.

These advantages lead to improved plant growth and reduced plant losses.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim

1. An underground capillary system for providing fluids to the root zone of plants growing in soil, the system comprising:

a conduit with a plurality of perforations, said conduit sandwiched between an upper layer of a capillary cloth and a lower layer of at least one of a capillary cloth and a fluid-impermeable material;

means for joining the upper layer and the lower layer so as to form a linearly-extending pocket, the pocket retaining said conduit, the upper layer and the lower layer together forming a combined layer which extends away from the linearly-extending pocket so as to provide a region consisting of said combined layer capable of moving fluids away from or towards the conduit; and a connection means for one end of the conduit so as to allow for a supply of fluids including at least one of water, solutions and gases to the conduit.

2. The underground capillary system of claim 1 further including a fluid-control means for an end of the conduit remote from the one end containing the connection means.

3. The underground capillary system of claim 1, wherein said means for joining said linearly-extending pocket of said upper layer to said lower layer includes at least one of stitching, sonic welding, gluing, and sewing.

4. The underground capillary system of claim 1, the system further comprising:

a plurality of conduits; and a plurality of pockets.

5. The underground capillary system of claim 1, wherein each perforation in the conduit has a cross sectional area of about 0.75 to 25 $mm^2$.

6. The underground capillary system of claims 1, wherein each perforation in the conduit has a cross sectional area of about 3 $mm^2$.

7. The underground capillary system of claim 1, wherein each perforation in the conduit is substantially circularly shaped with a diameter of about 2 mm.

8. The underground capillary system of claim 1, wherein each perforation in the conduit is substantially rectangularly shaped with sides of about 1.5 mm and 4 mm.

9. The underground capillary system of claim 1, wherein the cross sectional area of each perforation varies along a length of said conduit.

10. The underground capillary system of claim 1, wherein said cross sectional area of said conduit varies along a length of said conduit.

11. The underground capillary system of claim 1, wherein said conduit is made of polyethylene.

12. An aboveground capillary system for providing fluids to the root zone of a plant growing in soil in a container, the system comprising:

a conduit with a plurality of perforations, said conduit sandwiched between an upper layer of a capillary cloth and a lower layer of at least one of a capillary cloth and a fluid-impermeable material;

a third layer positioned above the upper layer, the third layer communicating with the soil in the container;

means for joining the upper layer and the lower layer so as to form a linearly-extending pocket, the pocket retaining said conduit, the upper layer with the third layer and the lower layer together forming a combined layer which extends away from the linearly-extending pocket so as to provide a region consisting of said combined layer capable of moving fluids away from or towards the conduit; and a connection means for one end of the conduit so as to allow for a supply of fluids including at least one of water, solutions and gases to the conduit.

13. The aboveground capillary system of claim 12 further including a fluid-control means for an end of the conduit remote from the one end containing the connection means.

14. The aboveground capillary system of claim 12, wherein said means for joining said linearly-extending pocket of said upper layer to said lower layer includes at least one of stitching, sonic welding, gluing, and sewing.

15. The aboveground capillary system of claim 12, wherein the third layer comprises a weedmat.

16. The aboveground capillary system of claim 12, the system further comprising:

a plurality of conduits; and a plurality of pockets.

17. The aboveground capillary system of claim 12, wherein said fluid-impermeable material of said lower layer includes polyethylene.

18. The aboveground capillary system of claim 12, wherein each perforation in the conduit has a cross sectional area of about 0.75 to 25 $mm^2$.

19. The aboveground capillary system of claim 12, wherein each perforation in the conduit has a cross sectional area of about 3 $mm^2$.

20. The aboveground capillary system of claim 12, wherein each perforation in the conduit is substantially circularly shaped with a diameter of about 2 mm.

21. The aboveground capillary system of claim 12, wherein each perforation in the conduit is substantially rectangularly shaped with sides of about 1.5 mm and 4 mm.

22. The aboveground capillary system of claim 12, wherein cross sectional area of each perforation in the conduit varies along a length of said conduit.

23. The aboveground capillary system of claim 12, wherein cross sectional area of said conduit varies along a length of said conduit.

24. The aboveground capillary system of claim 12, wherein said conduit is made of polyethylene.

25. A method for providing fluids to roots of plants growing in the ground, the method comprising:

disposing an underground capillary system within an area of soil below and in proximity of the root zone of the plants, the underground capillary system comprising a conduit with a plurality of perforations, said conduit sandwiched between an upper layer of a capillary cloth and a lower layer of at least one of a capillary cloth and a fluid-impermeable material, means for joining the upper layer and the lower layer so as to form a linearly-extending pocket, the pocket retaining said conduit, the upper layer and the lower layer together forming a combined layer which extends away from the linearly-extending pocket so as to provide a region consisting of said combined layer capable of moving fluids away from or towards the conduit, and a connection means for one end of the conduit so as to allow for a supply of fluids including at least one of water, solutions and gases to the conduit; and supplying a source of fluids to the connection means of the underground capillary system so as to cause flow of the fluids away from the source through the conduit and combined layer to the soil.

26. The method for providing fluids to the roots of plants growing in the ground of claim 25, wherein the underground capillary system further includes a fluid-control means for an end of the conduit remote from the one end containing the connections means, such that when the supplying of the source of fluids is discontinued, fluids in the soil in proximity to the underground capillary system drain therefrom into the underground capillary system and out through the fluid-control means.

27. A method for providing fluids to the root zone of a plant growing in soil in a container, the method comprising;

placing a container having a means to allow fluids to enter soil contained therein on an aboveground capillary system comprising a conduit with a plurality of perforations, said conduit sandwiched between an upper layer of a capillary cloth and a lower layer of at least one of a capillary cloth and a fluid-impermeable material, a third layer positioned above the upper layer, the third layer being adapted to allow the capillary system to communicate with the soil in the container, means for joining the upper layer and the lower layer so as to form a linearly-extending pocket, the pocket retaining said conduit, the upper layer with the third layer and the lower layer together forming a combined layer which extends away from the linearly-extending pocket so as to provide a region consisting of said combined layer capable of moving fluids away from or towards the conduit, and a connection means for one end of the conduit so as to allow for a supply of fluids including at least one of water, solutions and gases to the conduit; and supplying a source of fluids to the connection means on one end of the conduit of the aboveground capillary system so as to cause the flow of the fluids away from the source through the conduit, the combined layer, and to the third layer allowing the transfer of the fluids to the soil in the container through the means positioned therein.

28. The method for providing fluids to the root zone of a plant growing in soil in a container of claim 27, wherein supplying the source of fluids is intermittent and fluids in the container drain therefrom into the aboveground capillary system when the supply of fluids is discontinued.

\* \* \* \* \*